Patented Aug. 31, 1943

2,328,455

UNITED STATES PATENT OFFICE 2,328,455

N$^1$-ALKALI METAL-N$^1$,N$^4$-DIHALOGEN ACYLSULPHANILAMIDES

Martin Everett Hultquist, Plainfield, and Moses L. Crossley, Bound Brook, N. J., assignors to American Cyanamid Company, New York, N. Y., a corporation of Maine No Drawing. Application July 2, 1942, Serial No. 449,476

9 Claims. (Cl. 260—397.7)

This invention relates to a new type of sulphanilamide derivative containing active halogen.

The activity of sulphanilamide against many bacteria has rendered it desirable to utilize it as an antiseptic. However, the action of sulphanilamide is selective and it is effective only against certain types of bacteria. Derivatives have been sought which would have more general antiseptic or germicidal action. It is to this type of derivative that the present invention relates.

According to the present invention N$^4$-acylsulphanilamides are produced containing active halogen. These compounds have germicidal action which is not sharply selective as in the case of sulphanilamide. The compounds of the present invention may be considered as N$^1$-alkali metal - N$^1$,N$^4$-dihalogen - N$^4$-acylsulphanilamides of the following formula:

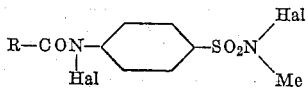

in which R is a hydrocarbon radical, Hal is an active halogen such as chlorine or bromine, and Me is an alkali metal. The compounds are quite soluble which is another important characteristic of practical germicides. For the sake of cheapness, the chlorine and sodium compounds are preferred, although the bromine compounds are equally effective and, of course, the other alkali metal compounds such as the potassium compounds are of substantially the same solubility and effectiveness. R may be a hydrocarbon radical of the aliphatic or aryl series, but for best results it should be an aliphatic radical having a moderate number of carbon atoms, the compounds where R is C$_3$H$_7$ being preferred. The product claims are not intended to be limited to any particular method of preparation, but in a more specific aspect a preferred process consists of treating N$^4$-acylsulphanilamide with an alkali metal hydrochloride.

The invention will be described in greater detail in conjunction with the following specific examples in which the parts are by weight.

EXAMPLE 1

N$^1$-sodium-N$^1$,N$^4$-dichloro-N$^4$-butanoyl-sulphanilamide

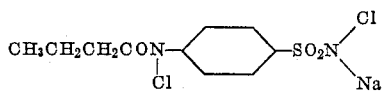

36 parts of N$^4$-butanoyl sulphanilamide are added to 300 parts of sodium hypochlorite solution containing 12% of active chlorine. A clear solution results and on cooling to 10° C. crystals separate out and are filtered off. The solid is then dissolved in about 500 parts of water at 60° C., the solution filtered and 150 parts of saturated salt solution added. On cooling to 10° C. filtering and washing with cold saturated sodium chloride solution, a crystalline product is obtained in the form of light tan needles. The product does not have any sharp melting point as it decomposes on melting at about 140°–150° C. Titration for active chlorine with sodium thiosulphate after adding potassium iodide and acetic acid shows about 98% purity. The product is contaminated with a small amount of sodium chloride.

EXAMPLE 2

N$^1$-sodium-N$^1$,N$^4$-dichloro-N$^4$-acetyl-sulphanilamide

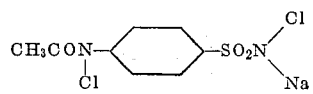

107 parts N$^4$-acetylsulphanilamide are slurried in 250 parts of water, and to this is added a 350 part portion of sodium hypochlorite solution containing 12% active chlorine, maintaining the temperature at 20–25° with cooling in a water bath. A light brown solution results, and on standing, leaf-like crystals separate and are filtered off.

The solid is dissolved in 300 parts of water at 60°, the solution is filtered and cooled to 10°, and the crystals are filtered and washed with a little ice-cold water. The almost colorless crystals are dried in a vacuum dessicator.

Titration of a sample for active chlorine with sodium thiosulphate after dissolving in water and treating with potassium iodide and acetic acid shows 99.5% purity. The product does not have any sharp melting point, but decomposes vigorously at 200–210° C.

EXAMPLE 3

N$^1$-sodium-N$^1$,N$^4$-dichloro-N$^4$-benzoyl-sulphanilamide

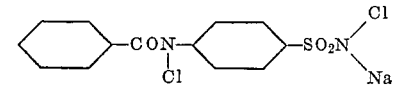

84 parts of N$^4$-benzoylsulphanilamide are slurried in 200 parts water, and to this is added a 300 part portion of sodium hypochlorite solution containing 12% active chlorine, maintaining the temperature at 20–30°.

After stirring 2 hours at 20–30°, the slurry is cooled to 10°, filtered and washed with ice-cold water. The solid is dissolved in 500 parts of water at 60°, the solution is clarified and cooled to 10°, and the colorless leaf-like crystals are filtered and washed with cold water. The wet cake is dried in a vacuum dessicator. Titration of a sample for active chlorine with sodium thiosulfate after treating with potassium iodide and acetic acid shows 99.4% purity. The product does not show any sharp melting point, but darkens gradually at 150–160° and decomposes at 160–170°.

We claim:

1. $N^1$-alkali metal - $N^1,N^4$ - dihalogen-$N^4$-acyl-sulphanilamide having the following probable formula:

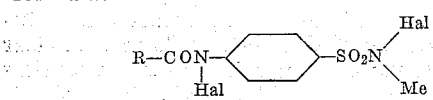

in which R is a hydrocarbon radical, Hal is a member of the group consisting of chlorine and bromine, and Me is an alkali metal.

2. $N^1$-alkali metal - $N^1,N^4$ - dihalogen-$N^4$-acyl-sulphanilamide having the following probable formula:

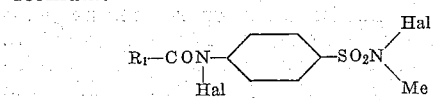

in which $R_1$ is an alkyl radical, Hal is a member of the group consisting of chlorine or bromine, and Me is an alkali metal.

3. $N^1$-alkali metal - $N^1,N^4$ - dichloro - $N^4$- acyl-sulphanilamide having the following probable formula:

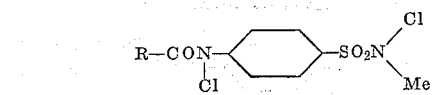

in which R is a hydrocarbon radical and Me is an alkali metal.

4. $N^1$-alkali metal - $N^1,N^4$ - dichloro - $N^4$- acyl-sulphanilamide having the following probable formula:

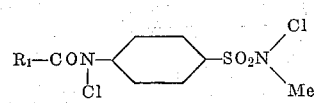

in which $R_1$ is an alkyl radical, and Me is an alkali metal.

5. $N^1$- sodium - $N^1, N^4$- dichloro - $N^4$- butanoyl-sulphanilamide having the following probable formula:

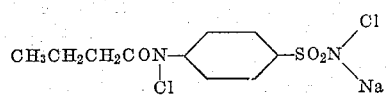

6. $N^1$-sodium - $N^1,N^4$-dichloro - $N^4$-acetylsulph-anilamide having the following probable formula:

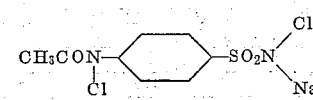

7. $N^1$-sodium-$N^1,N^4$-dichloro-$N^4$-benzoylsulph-anilamide having the following probable formula:

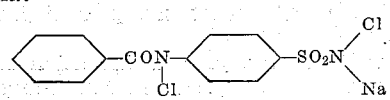

8. A method of preparing $N^1$-alkali metal-$N^1,N^4$-dihalogen-$N^4$-acylsulphanilamide which comprises reacting the corresponding $N^4$-acyl-sulphanilamide with an alkali metal hypohalite.

9. A method of preparing $N^1$-alkali metal-$N^1,N^4$- dichloro - $N^4$- acylsulphanilamide which comprises reacting the corresponding $N^4$-acyl-sulphanilamide with an alkali metal hypochlorite.

MARTIN EVERETT HULTQUIST.
MOSES L. CROSSLEY.